United States Patent [19]

Hayashida

[11] 4,397,276

[45] Aug. 9, 1983

[54] TWO-SHIFT THROTTLE CONTROL SYSTEM FOR AUTOMOTIVE INTERNAL COMBUSTION ENGINE

[75] Inventor: Tsutomu Hayashida, Yokohama, Japan

[73] Assignee: Nissan Motor Company, Limited, Yokohama, Japan

[21] Appl. No.: 359,055

[22] Filed: Mar. 17, 1982

[30] Foreign Application Priority Data

Apr. 15, 1981 [JP] Japan ................................ 56-752

[51] Int. Cl.³ .............................................. F02D 9/08
[52] U.S. Cl. ................................... 123/342; 123/376
[58] Field of Search ............... 123/319, 342, 349, 350, 123/376, 400, 402, 403; 74/513

[56] References Cited

U.S. PATENT DOCUMENTS 3,888,219  6/1975  Rogerson ........................... 123/342
3,997,019 12/1976  Inoue ................................. 123/376

FOREIGN PATENT DOCUMENTS 1171275  5/1964  Fed. Rep. of Germany ...... 123/342
55-22974  5/1980  Japan .

*Primary Examiner*—William A. Cuchlinski, Jr.

*Attorney, Agent, or Firm*—Lane, Aitken & Kananen

[57] ABSTRACT

A two-shift throttle control system for an automotive engine, comprising a lever to be actuated by an accelerator pedal, a pedal-actuated control cable anchored at one end to the pedal-actuated lever and pulled toward the lever when the pedal is depressed, a throttle actuator unit responsive to a selected vehicle speed and operative to produce a mechanical force variable with the selected vehicle speed, an automatically-actuated control cable connected at one end to the throttle actuator unit, a throttle actuator lever movable with the throttle valve in the fuel supply system of the engine, a throttle drive cable anchored at one end to the actuator lever, a stationary shaft, and first and second rotatable members rotatable on the shaft independently of each other, each of the pedal-actuated control cable and throttle drive cable being anchored at the other ends to the first rotatable member for driving the rotatable member to turn in one direction about the shaft when the accelerator pedal is depressed, the automatically-actuated control cable being anchored at the other end to the second rotatable member and being pulled away from the shift control device by the mechanical force of the throttle actuator unit for driving the second rotatable member to turn in the aforesaid direction about the shaft.

8 Claims, 5 Drawing Figures

TWO-SHIFT THROTTLE CONTROL SYSTEM FOR AUTOMOTIVE INTERNAL COMBUSTION ENGINE

FIELD OF THE INVENTION

The present invention relates to a two-shift throttle control system for an automotive internal combustion engine having a fuel supply system including a fluid induction pipe and a fluid-flow control valve such as a throttle valve provided in the induction pipe.

SUMMARY OF THE INVENTION

In accordance with the present invention, there is provided a two-shift throttle control system for an automotive internal combustion engine having a fuel supply system provided in with a vehicle body and including a fluid induction pipe and a fluid-flow control valve provided in the induction pipe, comprising a pedal-operated throttle control mechanism, an automatically-operated constant-speed cruising throttle control apparatus, throttle actuating means and a shift control device, the pedal-operated throttle control mechanism comprising (1) a manually-operated accelerator pedal, (2) a pedal-actuated lever with which the accelerator pedal is engageable, the accelerator pedal being operable for driving the lever for angular motion in first and second directions opposite to each other about an axis fixed with respect to the vehicle body, and (3) a pedal-actuated control cable anchored at one end thereof to the pedal-actuated lever and connected at the other end thereof to the shift control device, the pedal-actuated control cable being pulled toward the pedal-actuated lever when the lever is driven for angular motion in the first direction about the aforesaid axis, the constant-speed cruising throttle control apparatus comprising (4) a throttle actuator unit responsive to a preselected vehicle speed and operable for producing a mechanical force variable with the preselected vehicle speed, and (5) an automatically-actuated control cable connected at one end thereof to the throttle actuator unit and at the other end thereof to the shift control device, the throttle actuating means comprising (6) a throttle actuator lever movable with the fluid-flow control valve of the fuel supply system, and (7) a throttle drive cable anchored at one end thereof to the throttle actuator lever and connected at the other end thereof to the shift control device, and the shift control device comprising (8) a shaft having a center axis fixed with respect to the vehicle body, (9) a first rotatable member rotatable on the shaft about the center axis thereof, and (10) a second rotatable member rotatable on the above mentioned shaft about the center axis thereof independently of the first rotatable member, each of the first and second rotatable members being rotatable in first and second directions opposite to each other about the center axis thereof, each of the pedal-actuated control cable and the throttle drive cable being anchored at the aforesaid other end thereof to the first rotatable member for driving the first rotatable member to turn in the second direction thereof about the center axis thereof when the pedal-actuated control cable is pulled toward the pedal-actuated lever, the automatically-actuated control cable being anchored at the aforesaid other end thereof to the second rotatable member and being pulled away from the shift control device by the mechanical force of the throttle actuator unit for driving the second rotatable member to turn in the second direction thereof about the center axis thereof, the turning motion of the second rotatable member in the second direction thereof producing engagement of the second rotatable member with the first rotatable member and resisting turning motion of the first rotatable member in the first direction thereof about the center axis thereof.

The term "manually-operated" as herein referred to in connection with the above mentioned fluid-flow control valve does not necessarily import that the valve must be operated by a human effort applied by hand directly thereto or to any actuating or servo means provided for the valve but should be interpreted as purporting that the valve may be operated by any mechanical force or forces applied or imparted directly or indirectly to the valve by personal intervention of, usually, a vehicle driver. Furthermore, the term "cable" herein referred to is not limited to a cable in an ordinarily accepted sense of the word but shall be any conventionally known flexible cordage element such as a strand, a rope, a cord of metal such as typically steel or of a fibrous material.

BRIEF DESCRIPTION OF THE DRAWINGS

Drawbacks of a prior-art two-shift throttle control system and further features and advantages of a two-shift throttle control system according to the present invention will be made clear in the following description in which.

DESCRIPTION OF THE PRIOR-ART

A typical example of a prior-art two-shift throttle control system for an automotive internal combustion engine of the nature to which the present invention generally appertains is taught in Japanese Utility Model Publication No. 55-22974.

Figure 1:
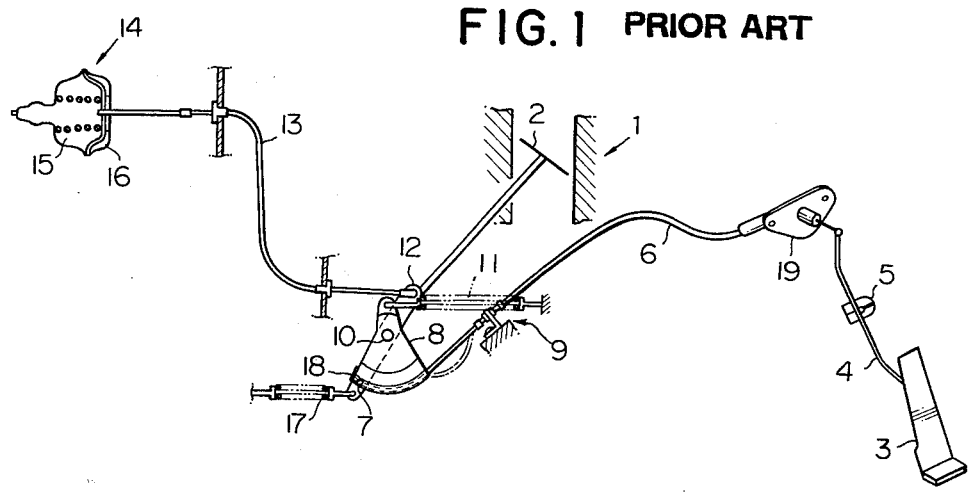
FIG. 1 is a schematic perspective view of a prior-art two-shift throttle control system of the nature to which the present invention generally appertains.

As shown schematically in FIG. 1 of the drawings, the throttle control system disclosed in the published Utility Model specification is provided for use in an automotive internal combustion engine having a fuel supply system of the type using a carburetor 1 equipped with a throttle valve 2. The throttle control system comprises a pedal-operated throttle control mechanism including an accelerator pedal 3, and an accelerator pedal lever 4 constantly engaged by the accelerator pedal 3. The accelerator pedal lever 4 is rockable on a stationary fulcrum or hinge pin 5 and has a pedal-actuated control cable 6 anchored at one end thereof to the pedal lever 4. The pedal-actuated control cable 6 is connected at the other end thereof to an anchor element 7 secured to a generally sector-shaped pedal-driven rotary drum 8 and has an intermediate portion clipped or otherwise fitted as at 9 to a structural member or portion of the dashboard structure. The pedal-actuated control cable 6 has a leading end portion received in an arcuate groove formed in the rotary drum 8. The pedal-driven rotary drum 8 is rotatable with a torsion shaft 10 connected to the throttle valve 2 of the carburetor 1 as shown. The pedal-driven rotary drum 8 is urged to turn with the torsion shaft 10 by a return spring 11 in a direction to pull the control cable 6 away from the pedal-actuated lever 4. The prior-art two-shift throttle control system further comprises an automatically-operated constant-speed cruising throttle control apparatus including an idler lever 12 rotatable on the above mentioned torsion shaft 10 and having an automatically-actuated control cable 13 anchored at one end thereof to an end portion of the lever 12. The automatically-actuated control cable 13 is connected at the other end thereof to a vacuum-operated throttle actuator unit 14 having a control chamber 15 defined in part by a spring-loaded flexible diaphragm element 16 to which the control cable 13 is securely anchored at the leading end thereof. The idler lever 12 is urged to turn on the torsion shaft 10 in a direction to pull the automatically-actuated control cable 13 away from the throttle actuator unit 14 by means of a return spring 17. Furthermore, the idler lever 12 has a bent tongue portion 18 which is adapted to be brought into abutting engagement with a side edge portion of the rotary drum 10 when the idler lever 12 is caused to turn on the torsion shaft 10 in a direction opposite to the direction in which the lever 12 is urged to turn by the return spring 17. Designated by reference numeral 19 is a stay member secured to a suitable structural member of the vehicle body and having the pedal-actuated control cable 6 passed therethrough so as to preclude the control cable 6 from being hauled excessively away from the pedal-actuated lever 4 by the force of the return spring 11.

When the accelerator pedal 3 in the prior-art throttle control system thus constructed and arranged is depressed, the pedal-actuated lever 4 is forced to turn on the fulcrum or hinge pin 5 and thereby hauls the pedal-actuated control cable 6 toward the lever 4. The pedal-driven rotary drum 8 is thus driven to turn together with the torsion shaft 10 against the force of the return spring 11 and causes the throttle valve 2 of the carburetor 1 to turn in a direction to provide an increased degree of opening through the throttle valve 2, thereby accelerating the vehicle. In this instance, a vacuum usually inducted from the intake manifold (not shown) of the engine is developed in the control chamber 15 of the actuator unit 14, the spring-loaded diaphragm element 16 is forced to deform in a direction to contract the control chamber 15 and hauls the control cable 13 toward the actuator unit 14 against the force of the spring acting on the diaphragm element 16. As a consequence, the idler lever 12 is driven to turn on the torsion shaft 10 against the force of the return spring 17 into a predetermined angular position having its bent tongue portion 18 brought into pressing engagement with the above mentioned side edge portion of the rotary drum 8. It therefore follows that the pedal-driven rotary drum 8 and accordingly the torsion shaft 10 are held in predetermined angular positions about the center axis of the shaft 10 so that the throttle valve 2 in the curburetor 1 is maintained in a predetermined angular position therein, establishing a predetermined flow rate of fluid past the throttle valve 2 and accordingly enabling the vehicle to cruise at a predetermined vehicle speed.

The prior-art two-shift throttle control system of the above described nature has a drawback which results from the fact that the pedal-actuated control cable 6 fitted as at 9 to the dashboard structure of the vehicle body is connected to the throttle valve 2 of the carburetor 1 by means of the torsion shaft 10. The torsion shaft 10 being disposed in the vicinity of the above mentioned structural member or portion of the dashboard structure, the component members of the constant-speed cruising throttle control apparatus tend to interfere with various members and elements of the neighboring devices and units such as the hydraulic booster units of the power-assisted brake and clutch systems (not shown) provided in the vehicle. To avoid the interference of, for example, the torsion shaft 10 with such members and elements, extra design considerations must be paid to have the torsion shaft 10 inclined appropriately with respect to the particular members and elements. Drawbacks are further pointed out in that the automatically-actuated control cable 13 intervening between the idler lever 12 and the vacuum-operated throttle actuator unit 14 must be arranged to extend along a prescribed path with respect to the vehicle body and in that the throttle actuator unit 14 must be designed to have an unduly large capacity to compensate for the force uselessly transmitted to the vehicle body. The present invention aims at elimination of these drawbacks of a prior-art two-shift throttle control system of the described general nature without having recourse to such arrangements of the automatically-operated constant-speed cruising throttle control apparatus of the throttle control system for an automotive internal combustion engine.

DESCRIPTION OF THE PREFERRED EMBODIMENT

Figure 2:
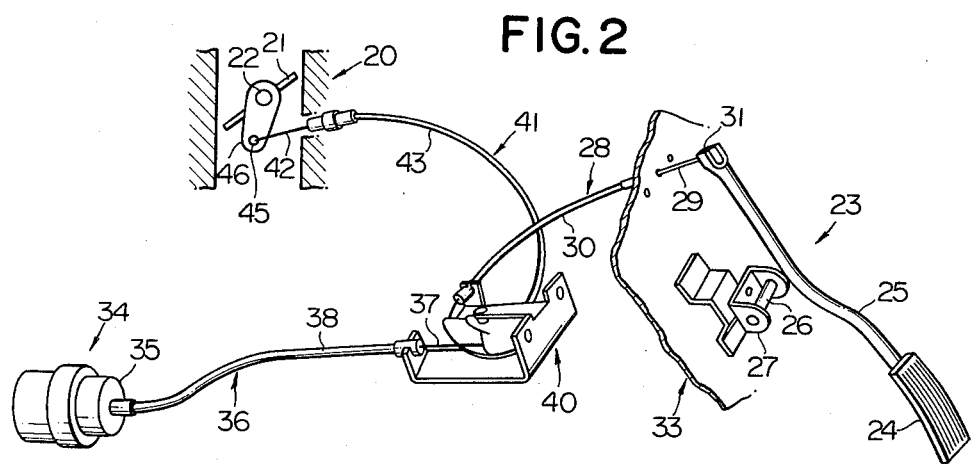
FIG. 2 is a view similar to FIG. 1 but shows the overall construction and arrangement of a embodiment of a two-shift throttle control system according to the present invention.

Referring to FIG. 2 of the drawings, a preferred embodiment of a two-shift throttle control system according to the present invention is also provided for use in an automotive internal combustion engine having a fuel supply system including a fluid induction pipe 20 having a fluid-flow control valve constituted by a throttle valve 21. The fluid induction pipe 20 may be constituted by a carburetor or an air induction pipe of a fuel injection internal combustion engine. The throttle valve 21 provided in the carburetor or the air induction pipe is thus rotatable on a throttle valve shaft 22 between a "full throttle" angular position providing a maximum flow rate and an "idling" angular position providing a minimum flow rate of fluid therethrough as is well known in the art. The throttle valve 21 is, thus, operable for varying the load applied to the internal combustion engine between maximum and minimum values and thereby enabling the automotive vehicle to cruise at speed variable with the degree to which the throttle valve 21 is allowed to be open in the fluid induction pipe 20.

Figure 3:
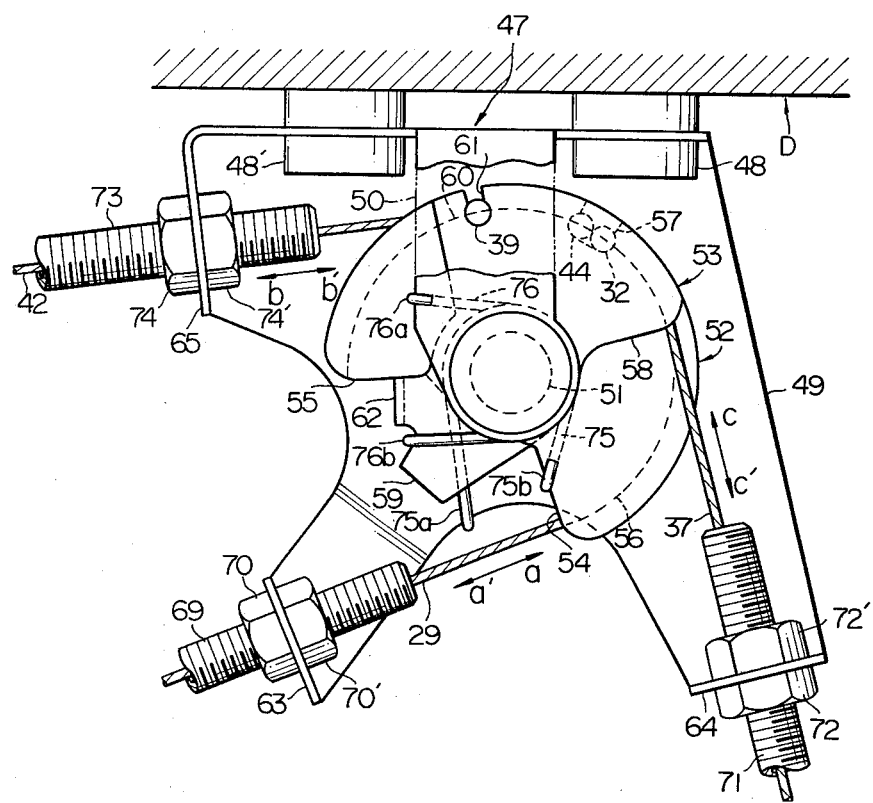
FIG. 3 is a plan view showing, to an enlarged scale, a shift control device forming part of the throttle control system embodying the present invention as shown in FIG. 2.
Figure 4:
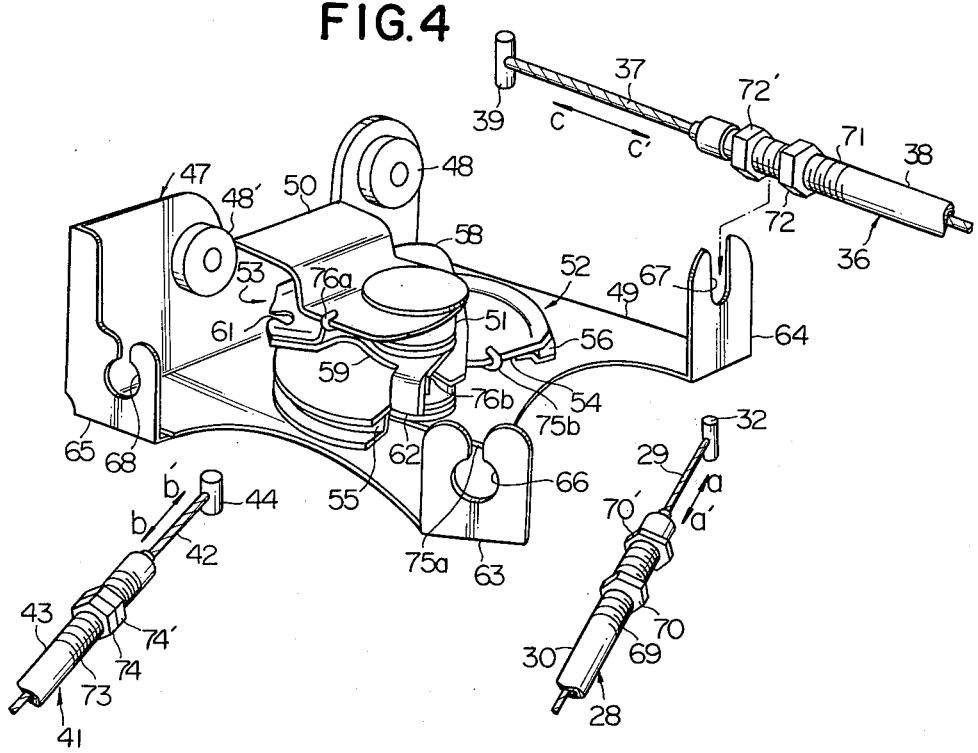
FIG. 4 is an exploded perspective view of the shift control device shown in FIG. 3.

The throttle control system embodying the present invention comprises a pedal-operated throttle control mechanism 23 including an accelerator pedal 24, and an accelerator pedal lever 25 having a lower end portion engaged by the accelerator pedal 24. The accelerator pedal lever 25 is rockable on a fulcrum or hinge pin 26 mounted on a bracket member 27 secured to the vehicle body and has a bifurcated upper end portion. A pedal-actuated control cable 28 has a flexible steel wire cord 29 clad in a protective sheath 30 and connected at the opposite ends thereof to suitable end fittings such as anchor elements 31 and 32 as shown in FIGS. 2 to 4. The steel wire cord 29 has one of the anchor elements such as the anchor element 31 securely connected to the above mentioned bifurcated upper end portion of the accelerator pedal lever 25 and is endwise movably passed through an aperture formed in a structural member 33 of the dashboard structure of the vehicle body. The pedal-operated throttle control mechanism 23 further comprises suitable biasing means (not shown) adapted to urge the accelerator pedal 24 to stay in a position inoperative to pull the pedal-actuated control cable 28 toward the lever 25.

The throttle control system embodying the present invention further comprises an automatically-operated constant-speed cruising throttle control apparatus 34 including a vacuum-operated throttle actuator unit 35 and an automatically-actuated control cable 36 leading from the throttle actuator unit 35 as shown. The vacuum-operated throttle actuator unit 35 is constructed similarly to its counterpart in the constant-speed cruising throttle control apparatus of the prior-art throttle control system above described and has a control chamber defined in part by a spring-loaded flexible diaphragm element. Though not shown in the drawings, the control chamber of the vacuum-operated throttle actuator unit 35 communicates with a solenoid-operated servo valve having a valve element movable between a position establishing communication between the throttle actuator unit 35 and an air port open to the atmosphere and a position establishing communication between the throttle actuator unit 35 and a vacuum port communicating with a suitable source of vacuum such as the intake manifold of the engine. The valve element is continuously movable between the two positions in response to an electric current supplied to the solenoid coil also forming part of the servo valve from a control circuit including a sensor responsive to vehicle speed and a manually-operated vehicle-speed selector switch. The control circuit usually further includes a brake-responsive switch to open when the brake pedal is depressed and a clutch-responsive switch to open when the clutch pedal is depressed to make a shift between gear ratios in an automotive vehicle using a manually-operated power transmission system. The construction and arrangement of each of the above mentioned servo valve and control circuit are well known in the art and are not herein shown. The automatically-actuated control cable 36 has a flexible steel wire cord 37 clad in a protective sheath 38 and connected at one end thereof to a suitable end fitting such as an anchor element 39 (FIGS. 3 and 4). The wire cord 37 is anchored at one end thereof to the diaphragm element of the throttle actuator unit 35. Though not shown in the drawings, the vacuum-operated throttle actuator unit 35 further includes a spring ordinarily accommodated in the control chamber thereof and acts on the diaphragm element of the throttle actuator unit 35 so as to constantly urge the automatically-actuated control cable 36 to be pulled away from the actuator unit 35 as will be gathered from the illustrations of FIGS. 1 and 2.

The two-shift throttle control system embodying the present invention further comprises a shift control device 40 intervening in effect between the above described pedal-operated throttle control mechanism 23 and constant-speed cruising throttle control apparatus 34 and operatively connected to the throttle valve 21 through a throttle drive cable 41. The throttle drive cable 41 has a flexible steel wire cord 42 clad in a protective sheath 43 and connected at one end thereof to a suitable end fitting such as an anchor element 44 (FIGS. 3 and 4) and a suitable end fitting such as an anchor element 45 (FIG. 2). As shown in FIG. 2, the wire cord 42 of the throttle drive cable 41 has its anchor element 45 fixedly connected to a throttle actuator lever 46 secured to and rotatable with the throttle valve shaft 22. The throttle drive cable 41 and the throttle actuator lever 46 as described above constitute in combination throttle actuating means in the two-shaft throttle control system embodying the present invention.

As shown to enlarged scales in FIGS. 3 and 4 of the drawings, the above mentioned shift control device 40 comprises a stationary support member 47 having stay portions 48 and 48' securely attached to a suitable structural member or portion such as, for example, an upper panel member D (FIG. 3) of the dashboard structure of the vehicle body. The support member 47 further has a flat base portion 49 and an overhang portion 50 extending away from the above mentioned upper panel member D and in part spaced apart in parallel from the flat base portion 49 as will be better seen from FIG. 4. A drum shaft 51 axially extends perpendicularly between the base and overhang portions 49 and 50 and is fixedly connected at both axial ends to the portions 49 and 50. The drum shaft 51 has rotatably mounted thereon first and second rotatable members which are respectively constituted by a pedal-driven rotary drum 52 and an automatically-driven rotary drum 53 and which are spaced apart in parallel from each other axially of the drum shaft 51. The pedal-driven rotary drum 52 and automatically-actuated rotary drum 53 are positioned between the base and overhang portions 49 and 50 with the former disposed closer to the base portion 49 and the latter disposed closer to the overhang portion 50 as will also be better seen from FIG. 4. The pedal-driven rotary drum 52 has a generally three-quarter circular configuration as will be seen from FIG. 3 and, thus, has two radial edge portions 54 and 55 which are angularly spaced apart from each other about the center axis of the drum shaft 51. The pedal-driven rotary drum 52 is formed with a three-quarter circularly curved groove 56 about the axis of rotation of the drum 52 as indicated by a broken line in FIG. 3. As also indicated by broken lines in FIG. 3, the rotary drum 52 has further formed in its outer peripheral portion a radial recess 57 which is open to the above mentioned groove 56. On the other hand, the automatically-driven rotary drum 53 has a generally sector-shaped portion 58 and an arm portion 59 extending away from the drum shaft 51 in approximately diametrically opposite relationship to the sector-shaped portion 58. The sector-shaped portion 58 of the rotary drum 53 is formed with an arcuately curved groove 60 about the center axis of the rotary drum 51 as also indicated by a broken line in FIG. 3 and is formed with a radial recess 61 which is open at the outer peripheral end of the portion 58 as indicated by full lines in FIG. 3, the radial recess 61 being open to the curved groove 60. The automatically-driven rotary drum 53 further has a lug portion 62 perpendicularly bent from the arm portion 59 toward the base portion 49 of the support member 47 and thus extending in parallel with the drum shaft 51. The lug portion 62 intervenes between the above mentioned radial edge portions 54 and 55 of the pedal-driven rotary drum 52. As will be understood more clearly as the description proceeds, the lug portion 62 of the rotary drum 53 is engageable with the radial edge portion 55 of the pedal-driven rotary drum 52 when the two rotary drums 52 and 53 assume predetermined angular positions with respect to each other about the center axis of the drum shaft 51.

The support member 47 further comprises first, second and third bracket portions 63, 64 and 65 perpendicularly bent or curved from the base portion 49 and respectively formed with slots 66, 67 and 68. The slots 66, 67 and 68 are adapted to permit the pedal-actuated control cable 28, the automatically-actuated control cable 36 and the throttle drive cable 41 to be fitted therein in such a manner that the pedal-actuated control cable 28 and the throttle drive cable 41 have leading end portions extending from the slots 66 and 68 to the rotary drum 52 on the center plane of the rotary drum 52 substantially perpendicular to the center axis of the shaft 51 of the control device 40, and the automatically-actuated control cable 36 has a leading end extending from the slot 68 to the rotary drum 53 on the center plane of the rotary drum 53. The protective sheath 30 is swaged in or otherwise closely fitted into an externally threaded sleeve 69 adjacent the anchor element 32 at which the wire cord 29 of the cable 28 is connected to the shift control device 40. The threaded sleeve 69 has mounted two nuts 70 and 70' and is fitted to the first bracket portion 63 through the slot 66 with the bracket portion 63 clamped between the nuts 70 and 70'. On the other hand, the protective sheath 38 is swaged or otherwise closely fitted into an externally threaded sleeve 71 adjacent the anchor element 39 at which the wire cord 37 of the cable 36 is connected to the shift control device 40. The threaded sleeve 71 has mounted two nuts 72 and 72' and is fitted to the second bracket portion 64 through the slot 67 with the bracket portion 64 clamped between the nuts 72 and 72'. Likewise, the protective sheath 43 is swaged in or otherwise closely fitted into an externally threaded sleeve 73 adjacent the anchor element 44 at which the wire cord 42 is connected to the shift control device 40. The threaded sleeve 73 has mounted thereon two nuts 74 and 74' and is fitted to the third bracket portion 65 through the slot 68 with the bracket portion 65 clamped between the nuts 74 and 74'. The pedal-actuated control cable 28 and the throttle drive cable 41 are endwise adjustably fitted to the first and third bracket portions 63 and 65, respectively, of the support member 47 in such a manner that the anchor elements 32 and 44 at the leading ends of the wire cords 29 and 42 are commonly fitted in the previously mentioned radial recess 57 in the pedal-driven rotary drum 52 as shown in FIG. 3. Thus, the respective wire cords 39 and 42 are each in part arcuately received in the groove 56 and are endwise movable arcuately about the center axis of the drum shaft 51 when the rotary drum 52 is driven for rotation on the drum shaft 51. On the other hand, the automatically-actuated control cable 36 is endwise adjustably fitted to the second bracket portion 64 in such a manner that the anchor element 39 at the leading end of the wire cord 37 is fitted in the radial recess 61. The wire cord 37 is in part arcuately received in the curved groove 60 in the rotary drum 53 and is endwise movable arcuately about the center axis of the drum shaft 51 when the rotary drum 53 is driven for rotation on the drum shaft 51. The pedal-driven rotary drum 52 having the wire cords 29 and 42 anchored thereto is urged by first biasing means to turn about the center axis of the drum shaft 51 counter-clockwise in FIG. 3, viz., in a direction in which the wire cords 29 and 42 are hauled in directions indicated by arrowheads a and b, respectively, in FIGS. 3 and 4, viz., away from the pedal-actuated lever 25 toward the throttle actuator lever 46 (FIG. 2). In FIGS. 3 and 4 of the drawings, such first biasing means is shown as comprising a preloaded helical torsion spring 75 coaxially surrounding the drum shaft 51 and having one end portion 75a hooked to a side edge of the base portion 49 and another end portion 75b hooked to the previously mentioned radial edge portion 54. On the other hand, the automatically-driven rotary drum 53 having the wire cord 37 anchored thereto as described above is urged by second biasing means to turn about the center axis of the drum shaft 51 also in a counter-clockwise direction in FIG. 3, viz., in a direction in which the wire cord 37 is hauled in a direction indicated by arrowhead c in FIGS. 3 and 4, viz., away from the vacuum-operated throttle actuator unit 35. In FIGS. 3 and 4, such biasing means is shown as comprising a preloaded helical torsion spring 76 also coaxially surrounding the drum shaft 51 and having one end portion 76a hooked to a side edge of the overhand portion 50 and another end portion 76b hooked to a side edge of the previously mentioned arm portion 59.

Description will be hereinafter made with reference concurrently to FIGS. 2 to 4 of the drawings regarding the modes of operation of the two-shift throttle control system thus constructed and arranged in accordance with the present invention. When, now, the accelerator pedal 24 is depressed by the vehicle driver during cruising of the vehicle, the pedal-actuated lever 25 is caused to turn about the fulcrum or hinge pin 27 in a direction to haul the pedal-actuated control cable 28 against the force of the previously mentioned biasing means (not shown) acting on the pedal 24. Being subjected to the pull thus given by the pedal-actuated lever 25, the wire cord 29 is endwise moved through the protective sheath 30 toward the pedal-actuated lever 25 as indicated by arrowhead a' in FIGS. 3 and 4, viz., tangentially to the three-quarter circularly curved groove 56 and drives the rotary drum 52 to turn on the drum shaft 51 clockwise in each of FIGS. 3 and 4 about the center axis of the shaft 51 against the force of the torsion spring 75. The turning motion of the pedal-driven rotary drum 52 is transmitted through the anchor element 44 to the wire cord 42 which is therefore forced to endwise move away from the fluid induction pipe 20 as indicated by arrowhead b' in FIGS. 3 and 4, viz., also tangentially to the groove 56 in the drum 52. It therefore follows that the throttle actuator lever 46 is caused to turn together with the throttle valve 21 about the center axis of the throttle valve shaft 22 in a direction to provide an increased degree of opening across the throttle valve 21 in the fluid induction pipe 20 of the fuel supply system, thereby producing acceleration in the internal combustion engine of the vehicle.

When, under these conditions, the previously mentioned vehicle-speed selector switch included in the throttle control apparatus 34 is closed and is conditioned to command the vehicle to cruise at a selected speed, the air which has filled the control chamber of the throttle actuator unit 35 is discharged from the control chamber by the vacuum developed therein through, for example, the intake manifold (not shown) of the engine and forces the diaphragm element in the throttle actuator unit 35 to move or deform in a direction to produce contraction of the chamber. The result is that the wire cord 37 anchored to the above mentioned diaphragm element is hauled toward the throttle actuator unit 35 and is caused to endwise move through the protective sheath 38 in the direction indicated by arrowhead c' in FIGS. 3 and 4, viz., tangentially to the arcuately curved groove 60. The wire cord 37 thus drives the automatically-driven rotary drum 53 to turn on the drum shaft 51 clockwise in FIGS. 3 and 4 about the center axis of the shaft 51 against the force of the torsion spring 76. As the rotary drum 53 is thus caused to turn clockwise, the previously mentioned lug portion 62 is brought into abutting engagement with the radial edge portion 55 of the pedal-driven rotary drum 53 which has been turned on the drum shaft 51 with the accelerator pedal 24 held depressed as above discussed. It therefore follows that the pedal-driven rotary drum 52 is forced to turn clockwise about the center axis of the drum shaft 51 against the force of the torsion spring 75 until the rotary drum 53 and accordingly the pedal-driven rotary drum 52 reach angular positions dictated by the amount of displacement of the diaphragm element of the vacuum-operated throttle actuator unit 35, viz., by the vehicle speed selected on the vehicle-speed selector switch of the control circuit. The throttle actuator lever 46 to which the wire cord 42 is anchored at its leading end is therefore caused to turn together with the throttle valve 21 about the center axis of the throttle valve shaft 22 in a direction in which the degree of opening provided through the throttle valve 21 corresponds to the selected vehicle speed, thereby causing the internal combustion engine of the vehicle to operate at a fixed revolution speed.

If, during cruising of the vehicle, the brake pedal is depressed to produce deceleration of the vehicle or the clutch pedal is depressed to make a shift between gear ratios in the power transmission system, the supply of a control current to the servo valve for actuating the throttle actuator unit 35 is interrupted. Under these conditions, atmospheric air is admitted into the control chamber of the vacuum-operated throttle actuator unit 35 under the control of the servo valve associated therewith. The throttle actuator unit 35 is accordingly disabled from pulling the automatically-actuated control cable 36 away from the shaft control device 40 so that the automatically-driven rotary drum 53 and therefore the pedal-driven rotary drum 52 are caused to turn back to the initial angular positions about the center axis of the drum shaft 51 by the force of the torsion springs 76 and 75. The pedal-driven rotary drum 52 is, thus, for a second time enabled to be turned on the drum shaft 51 in a direction to cause the throttle valve 21 to be wider open when the pedal-actuated control cable 28 is again hauled toward the pedal-actuated lever 25 with the accelerator pedal 24 depressed.

Figure 5:
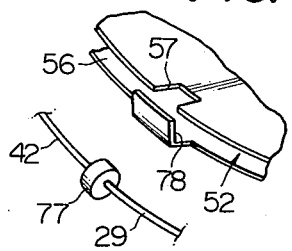
FIG. 5 is a fragmentary perspective view showing portions of a modification of the shift control device illustrated in FIGS. 3 and 4.

While the anchor elements 32 and 44 on the wire cords 29 and 42, respectively, are formed independently of each other and are commonly fitted in the radial recess 57 of the hereinbefore described embodiment of the present invention, the anchor elements 32 and 44 may be constructed integrally with each other and thus constituted by a single unitary anchor element 77 as shown in FIG. 5 of the drawings. In this instance, the unitary anchor element 77 is securely connected between the respective wire cords 29 and 42 and is snugly received in the radial recess 57. In order to prevent such a unitary anchor element 77 from being dislodged from the recess 57, the rotary drum 52 may be formed with a lug portion 78 located adjacent the open radially outer end of the recess 57 as is also shown in FIG. 5.

As will have been appreciated from the foregoing description, the two-shift throttle control system provided in accordance with the present invention is characterized in that the pedal-actuated control cable 28 and throttle drive cable 41 intervening between the pedal-actuated lever 25 and the throttle actuator lever 46 are anchored to the pad rotary drum 52 and the automatically-actuated control cable 36 connected to the vacuum-operated throttle actuator unit 35 is anchored to the automatically-driven rotary drum 53. The throttle control system according to the present invention is further characterized in that the two rotary drums 52 and 53 are commonly mounted on the drum shaft 51 on the support member 47 which can be positioned with respect to the dashboard structure of the vehicle body in such a manner that the drum shaft 51 has its center axis in any desired direction with respect to the dashboard structure. Since there is, thus, no strict limitation in selecting the position of the support member 47 and accordingly the position of the shift control device 40 as a whole with respect to the dashboard structure of the vehicle body, the directions in which the individual cables 28, 36 and 41 are to be endwise hauled can be selected so that any of the cables 28, 36 and 41 will not interfere with the various component members of, for example, the hydraulic booster units of the power-assisted brake systems provided in the vehicle. Thus, the shift control device 40 may be located in front of one of the hood ledge panels (not shown) forming part of the vehicle body and protruding into the engine compartment.

What is claimed is:

1. A two-shift throttle control system for an automotive internal combustion engine having a fuel supply system provided in a vehicle body and including a fluid induction pipe and a fluid-flow control valve provided in the induction pipe, comprising a pedal-operated throttle control mechanism, an automatically-operated constant-speed cruising throttle control apparatus, throttle actuating means and a shift control device, said pedal-operated throttle control mechanism comprising (1) a manually-operated accelerator pedal, (2) a pedal-actuated lever with which the accelerator pedal is engageable, the accelerator pedal being operable for driving the lever for angular motion in first and second directions opposite to each other about an axis fixed with respect to the vehicle body, and (3) a pedal-actuated control cable anchored at one end thereof to the pedal-actuated lever and connected at the other end thereof to said shift control device, the pedal-actuated control cable being pulled toward said pedal-actuated lever when the lever is driven for angular motion in the first direction about said axis, said automatically-operated constant-speed cruising throttle control apparatus comprising (4) a throttle actuator unit responsive to a preselected vehicle speed and operable for producing a mechanical force variable with the preselected vehicle speed, and (5) an automatically-actuated control cable connected at one end thereof to the throttle actuator unit and at the other end thereof to said shift control device, said throttle actuating means comprising (6) a throttle actuator lever movable with said fluid-flow control valve, and (7) a throttle drive cable anchored at one end thereof to the throttle actuator lever and connected at the other end thereof to said shift control device, and said shift control device comprising (8) a shaft having a center axis fixed with respect to the vehicle body, (9) a first rotatable member rotatable on said shaft about the center axis thereof, and (10) a second rotatable member rotatable on said shaft about the center axis of the shaft independently of the first rotatable member, each of the first and second rotatable members being rotatable in first and second directions opposite to each other about the center axis thereof, each of said pedal-actuated control cable and said throttle drive cable being anchored at said other end thereof to said first rotatable member for driving the first rotatable member to turn in the second direction thereof about the center axis thereof when the pedal-actuated control cable is pulled toward said pedal-actuated lever, said automatically-actuated control cable being anchored at said other end thereof to said second rotatable member and being pulled away from said shift control device by said mechanical force of said throttle actuator unit for driving the second rotatable member to turn in the second direction thereof about the center axis thereof, the turning motion of the second rotatable member in the second direction thereof about the center axis of said shaft producing engagement of the second rotatable member with said first rotatable member and resisting turning motion of the first rotatable member in the first direction thereof about the center axis thereof.

2. A two-shift throttle control system for an automotive internal combustion engine as set forth in claim 1, wherein said first rotatable member of said shift control device has a curved groove in which each of said pedal-actuated control cable and said throttle drive cable has an end portion received arcuately and wherein said second rotatable member of said shift control device has a curved groove in which said automatically-actuated control cable has an end portion received arcuately.

3. A two-shift throttle control system for an automotive internal combustion engine as set forth in claim 2, wherein each of said first rotatable member and said second rotatable member is formed with a radial recess open to the curved groove in the drum and wherein said end portion of each of said pedal-actuated control cable, automatically-actuated control cable and throttle drive cable has an end fitting at the leading end thereof, the respective end fittings of the pedal-actuated control cable and the throttle drive cable being fitted commonly in the radial recess in said first rotatable member and the end fitting of said automatically-actuated control cable being fitted in the radial recess in said second rotatable member.

4. A two-shift throttle control system for an automotive internal combustion engine as set forth in claim 3, wherein said end fittings of the pedal-actuated control cable and the throttle drive cable, respectively, are constituted by a single unitary element.

5. A two-shift throttle control system for an automotive internal combustion engine as set forth in any one of claims 1 to 4, wherein said first rotatable member and said second rotatable member are spaced apart substantially parallel from each other axially of said shaft.

6. A two-shift throttle control system for an automotive internal combustion engine as set forth in any one of claims 1 to 4, wherein said first rotatable member has a radial edge portion and said second rotatable member has a lug portion extending substantially in parallel with said shaft, said radial edge portion of the first rotatable member and said lug portion of the second rotatable member being arranged so that the lug portion is brought into abutting engagement with the radial edge portion when the second rotatable member is caused to turn in the second direction thereof with respect to the first rotatable member about the center axis thereof.

7. A two-shift throttle control system for an automotive internal combustion engine as set forth in claim 6, wherein said shift control device further comprises first biasing means urging said first rotatable member to turn in the first direction about the center axis thereof and second biasing means urging said second rotatable member to turn in the first direction about the center axis thereof.

8. A two-shift throttle control system for an internal combustion engine as set forth in claim 1, wherein said shift control device further comprises a stationary support member securely attached to the vehicle body and having formed therein first, second and third slots respectively having said pedal-actuated control cable, said throttle drive cable and said automatically-actuated control cable fitted therein, said pedal-actuated control cable and said throttle drive cable having leading end portions extending from the first and second slots, respectively, to the first rotatable member on the center plane of the first rotatable member substantially perpendicular to the center axis of said shaft of the control device, and said automatically-actuated control cable having a leading end portion extending from the third slot to the second rotatable member on the center plane of the second rotatable member substantially perpendicular to the center axis of said shaft of the control device.

* * * * *